United States Patent [19]

Morgan et al.

[11] 3,968,037

[45] July 6, 1976

[54] EMULSION POLYMERIZATION OF CATIONIC MONOMERS

[75] Inventors: Janice Elaine Morgan, Carnegie; Jerry Emile Boothe, Coraopolis, both of Pa.

[73] Assignee: Calgon Corporation, Pittsburgh, Pa.

[22] Filed: June 17, 1974

[21] Appl. No.: 479,922

Related U.S. Application Data

[62] Division of Ser. No. 285,888, Sept. 1, 1972, abandoned.

[52] U.S. Cl. .................................. 210/47; 210/10; 210/54
[51] Int. Cl.² .............................................. C02B 1/20
[58] Field of Search ............ 210/10, 42, 47, 51–54; 260/80.3 N, 80.3 R

[56] References Cited
UNITED STATES PATENTS

| | | | |
|---|---|---|---|
| 2,923,701 | 2/1960 | Schuller et al. | 260/85.5 |
| 3,171,805 | 3/1965 | Suen et al. | 210/54 |
| 3,235,490 | 2/1966 | Goren | 210/52 |
| 3,284,393 | 11/1966 | Vanderhoff | 260/34.2 |
| 3,288,770 | 11/1966 | Butler | 260/29.7 R |
| 3,752,760 | 8/1972 | Gordon et al. | 210/54 |
| 3,790,477 | 2/1974 | Nielsen et al. | 210/54 |

*Primary Examiner*—Charles N. Hart
*Assistant Examiner*—Peter A. Hruskoci
*Attorney, Agent, or Firm*—Rudolph J. Anderson, Jr.; Harry E. Westlake; Martin L. Katz

[57] ABSTRACT

Cationic monomers homopolymerized and copolymerized in water-in-oil emulsion systems with crosslinking and branching agents have surprisingly high effectiveness as flocculants and for the treatment of activated sewage sludge.

1 Claim, No Drawings

EMULSION POLYMERIZATION OF CATIONIC MONOMERS

This application is a division of U.S. Ser. No. 285,888, filed Sept. 1, 1972 now abandoned.

BACKGROUND OF THE INVENTION

This invention relates to the preparation of cationic polymers having a surprising degree of effectiveness as sludge dewatering agents and certain other uses.

In particular, the cationic polyelectrolytes manufactured by the method of this invention are made from cationic monomers such as dialkyl diallyl ammonium monomers and, preferably, certain quantities of triallyl and tetraallyl ammonium monomers as branching agents. The advantages of emulsion polymerization of these monomers will become apparent in the summary of the invention.

Prior to the present invention, the water-in-oil emulsion polymerization techniques of Vanderhoff et al, U.S. Pat. No. 3,284,393, had not been extended to include such cationic monomers as the diallyl dialkyl ammonium halides. Vanderhoff disclosed in his U.S. Pat. No. 3,284,393 that a water-in-oil emulsion technique could be used to prepare polymers from certain water-soluble monomers. However, he did not teach the unique effect of such polymerization techniques on crosslinking of the monomers. Nor did he recognize that the diallyl monomers in particular are unusually receptive to the water-in-oil polymerization techniques.

Butler, in U.S. Pat. No. 3,288,770, disclosed a method of suspension polymerization of dimethyl diallyl ammonium chloride, using ethyl benzene as a solvent. There was no surfactant or emulsifier present in that example. The suspension polymerization method of Butler has never been used commercially because it provides no advantage over a simple solution polymerization method. Moreover, the suspension system of Friedrich et al as described in U.S. Pat. No. 2,982,749 has not been used commercially for the manufacture of cationic polymers for the same reason.

SUMMARY OF THE INVENTION

We have discovered that cationic polyelectrolytes highly effective as flocculants may be produced by the inverse emulsion polymerization of water-soluble cationic monomers in the presence of a crosslinking polyolefinic unsaturated comonomer. In solution or suspension polymerization of cationic monomers including the quantities of crosslinking polyolefinic unsaturated comonomers used in our invention, the resulting polymer is crosslinked and not effective as a flocculant or dewatering agent. The use of our inverse emulsion technique allows relatively high quantities of polyunsaturated comonomers to be utilized yet results in water-soluble or dispersible products.

The cationic monomers useful in the practice of this invention include dimethyl diallyl ammonium chloride (which is not a crosslinking agent), acryloxyethyl trimethyl ammonium chloride, methacryloxyethyl trimethyl ammonium chloride, vinyl benzyl trimethyl ammonium chloride, methyl (vinyl pyridinium) ammonium chloride, 3-methacryloxyl (2 hydroxy propyl) trimethyl ammonium chloride, and 3-acrylamido-3-methyl butyl trimethyl ammonium chloride.

Cationic monomers of the following formulas may be used:

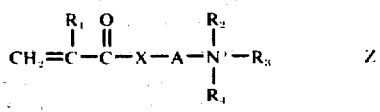

where $R_1$ is H or methyl; $R_2$ is H or lower alkyl to $C_4$; $R_3$ and/or $R_4$ are H, lower alkyl to $C_{12}$, benzyl or hydroxyethyl and $R_3$ and $R_4$ can combine to form a cyclic ring containing one or more hetero atoms; and Z is the conjugate base of an acid with a dissociation constant greater than $1 \times 10^{-3}$; X is O or NH; and A is alkylene group or

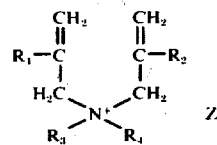

where $R_1$ and $R_2$ are H or methyl; $R_3$ is H, alkyl to $C_{12}$ or benzyl; and $R_4$ is H, alkyl to $C_{12}$, benzyl or hydroxy ethyl; and Z is as defined above.

The crosslinking or branching comonomers employed in this system include tri and tetraallyl ammonium salts, methylenebisacrylamide, divinyl benzene, diallyl phthalate, polu allyl ethers of polyhydroxyl compounds, e.g., poly allyl sucrose, diallyl sorbitol, poly and other polyolefinic unsaturated compounds known to those skilled in the art of radical polymerization that normally (in systems other than inverse emulsion) lead to the formation of three-dimensional networks when used in high proportions. A complete list of such compounds applicable to this invention would be prohibitively long. Any polyolefinic unsaturated compound that would lead to insoluble polymer when copolymerized with other monomers by solution, suspension or bulk methods could be used in our invention as part of a water-soluble polymerization system.

The method for producing these compositions is similar to the inverse emulsion polymerization technique of Vanderhoff et al, U.S. Pat. No. 3,284,393, applied to different polymerization systems. In this method, certain water-soluble cationic monomers and crosslinking agents are dispersed with the addition of a surfactant in a water-insoluble hydrocarbon. A radical generating catalyst is added and the temperature maintained at a suitable value until the polymerization is essentially complete. The polymerized emulsion is a white to semi-transparent fluid. Depending upon the surfactant employed, the emulsion may be dissolved directly into water for use or the polymer isolated by evaporation of the solvent or solvent precipitation.

The specific embodiments of this invention are illustrated by the following examples, some of which are solution systems included for comparison.

EXAMPLE 1

Solution Polymerization of Dimethyl Diallyl Ammonium Chloride (DMDAAC)

To a one liter four-neck resin pot equipped with a mechanical stirrer, thermometer, condenser and purge tube was added 492 grams of 55 percent aqueous DMDAAC. The pH was adjusted to 6.0 with dilute hydrochloric acid, heated to 50°C. and purged with nitrogen for one hour with stirring. One milliliter of a 5 percent Na₄EDTA solution was added followed by 7 milliliters of a 75 percent solution of t-butylperoxypivalate in mineral spirits. The purge tube was lifted above the surface of the liquid and a nitrogen blanket maintained throughout the rest of the reaction. The solution began to polymerize in 15 to 30 minutes and was mildly exothermic. The temperature was maintained through the use of external cooling. At the end of 3 hours, stirring was impossible because of the viscosity of the reaction mixture. After 18 hours at 50° ± 2°C., the conversion to polymer had leveled off at 95 percent. A 1 percent solution of this product in distilled water was completely free of insoluble gel.

EXAMPLE 2

Solution Polymerization of DMDAAC, Including 0.1 Mole Percent Triallyl Methyl Ammonium Chloride The procedure was identical to that of Example 1, except 0.1 mole percent of triallyl methyl ammonium chloride was added to the reaction. A 1 percent solution of the resulting product partially dissolved with the remaining portion as highly hydrated gel. This crosslinked insoluble material is easily distinguished by those skilled in the art of polyelectrolytes.

EXAMPLE 3

Emulsion Polymerization of DMDAAC

To a one liter four-neck flask equipped with a stirrer, thermometer, condenser, purge tube, heating mantle and automatic heat regulating device was added 321.5 grams of benzene, 138.5 grams of 72.2 percent aqueous DMDAAC and 40 grams of a 20 percent aqueous solution of sodium octyl phenoxyethoxy-2-ethanol sulfate. The mixture was stirred at 170 to 180 rpm with a paddle stirrer and heated to 50° ± 1°C. The suspension was purged with nitrogen gas for 1 hour. A 1.4 milliliter aliquot of a 0.351 gram per 100 milliliters of ferrous ammonium sulfate hexahydrate was added followed by 0.336 milliliter of t-butylperoxypivalate (75 percent in mineral spirits). The solution was then stirred for 20 hours at 50°C. under a nitrogen blanket.

The polymer was isolated by evaporating the benzene under ambient conditions. The final product was a glassy solid. A 1 percent solution of this polymer showed no evidence of insoluble gel.

EXAMPLE 4

Emulsion Polymerization of DMDAAC, Plus 0.4 Mole Percent Triallyl Methyl Ammonium Chloride The procedure of Example 3 was repeated except 0.4 mole percent triallyl methyl ammonium chloride was added to the DMDAAC solution prior to polymerization. A 1 percent solution of the resulting product showed no evidence of insoluble gel.

EXAMPLE 5

Solution Polymerization of 3-Acrylamido-3-Methyl Butyl Trimethyl Ammonium Chloride (AMBTAC)

The equipment of Example 1 was used. A solution of 262.5 grams of distilled water, 150 grams of AMBTAC was adjusted to pH 9.5 and added to the reactor. The monomer solution was heated to 35°C. and purged for 1 hour with nitrogen gas. 0.263 milliliters of a 75 percent solution of t-butylperoxypivalate in mineral spirits was added (1.5 × 10⁻³ moles per mole of monomer). After approximately 25 minutes, the polymerization began as evidenced by an increase in viscosity and a slight increase in temperature. The solution was maintained at 35° ± 5° C. for 4 hours. A 1 percent solution of the resulting polymer was completely soluble.

EXAMPLE 6

Solution Polymerization of AMBTAC with 0.1 Mole Percent Methylenebisacrylamide

The procedure and equipment of Example 5 was used except 0.1 mole percent methylenebisacrylamide (MBA) was added. A 1 percent solution of the final gel in water contained considerable highly hydrated gel typical of crosslinked polyelectrolytes. Higher levels of MBA produce progressively greater amounts of gel.

EXAMPLE 7

Emulsion Polymerization of AMBTAC

To an eight ounce pop bottle was added 62 grams of benzene, 20 grams of AMBTAC dissolved in 10 grams of water, and 8 grams of a 20 percent aqueous solution of octyl phenoxyethoxy (2) ethanol sodium sulfate. The bottle was sealed with an airtight septum. Two syringe needles were inserted into the bottle. The bottle was then placed in a constant temperature bath set at 50°C. and agitated by shaking. Nitrogen gas was purged into the bottle through the syringe needle (the other needle serving as a vent). After 1 hour, the needles were removed. A 0.28 milliliter aliquot of a 0.351 gram per 100 milliliters of ferrous ammonium sulfate hexahydrate was injected into the bottle, followed by the injection of 0.07 milliliters of a 75 percent solution of t-butylperoxypivalate in mineral spirits. The bottle was agitated in the constant temperature bath for 20 hours. The product was isolated by adding the benzene emulsion to acetone, filtering the product and drying. A 1 percent solution of the final product was completely soluble in water.

EXAMPLE 8

Emulsion Polymerization of AMBTAC with 0.4 Mole Percent Methylenebisacrylamide (MBA)

The technique of Example 7 was used except 0.4 mole percent MBA was added before polymerization. The resulting polymer was completely soluble in water at 1 percent.

The polymers of our invention are useful in flocculating solid particles in aqueous suspension, as in the clarification of water. For this purpose, they may be added to the aqueous suspension in amounts as small as 0.1 ppm up to 20 ppm. A floc will form almost immediately and will settle in a short time, clarifying the water.

The polymers of Examples 1 through 8 were tested for their ability to improve the rate of water release of activated sewage sludge. Activated sewage sludge is known in the art to be extremely difficult to filter on vacuum filters commonly employed in municipal waste treatment. The laboratory test used to simulate the equipment is the Buchner Funnel Test. A portion of sludge is treated with the polyelectrolyte. The sample is poured into the Buchner funnel containing a standard filter paper and a standard vacuum is applied. The time to reach a specific volume of water drawn from the sludge is used as a measure of the effectiveness of the polymer. The shorter the time, the more effective the polymer is in this application. In the test shown in Table I, 500 milliliters of sludge was treated at the dosage shown and the time was recorded when 400 milliliters of filtrate had been collected.

Table I

| Buchner Funnel Test Data Dosage = 100 ppm | |
|---|---|
| Samples | Time (Seconds) |
| Example 1 | 277 |
| Example 2 | >600 |
| Example 3 | 486 |
| Example 4 | 94 |
| Example 5 | >600 |
| Example 6 | 347 |
| Example 7 | >600 |
| Example 8 | 125 |

The results of this test demonstrated that polymers of high performance are obtained by the emulsion process including a crosslinking agent.

The amount of branching (crosslinking) agent that can be used in solution, suspension or bulk polymerizations is extremely small. If one attempts to use the amount of branching agent contemplated in this invention only solvent-insoluble gels are formed. Such materials have no utility as water-soluble polymers. As shown in the examples, only ineffective products are obtained from solution polymerizations containing a branching agent. However, when the same or higher amounts of the branching agent are used in combination with emulsion polymerization techniques, a highly effective product is obtained. The examples also show that the emulsion polymerization technique itself does not produce effective product without the addition of a branching agent. It is this synergistic combination of a branching agent and the emulsion polymerization technique that is unexpected and the essence of this invention.

The proportions of the components of the emulsion vary depending upon the components chosen. We have limited our invention to water-soluble cationic monomers capable of producing water-soluble polymers by solution polymerization by radical mechanisms. The suspending medium can be any water-insoluble organic fluid that does not interfere with radical polymerization. The preferred suspending media are benzene, perchloroethylene, high aromatic distillates and saturated hydrocarbons such as hexane and mineral oil. The surface active agent and the amount used depend upon the nature of the cationic monomer and the suspending medium chosen. For dimethyl diallyl ammonium chloride and benzene, the preferred surface active agent is sodium octyl phenoxy-2-ethanol sulfate.

However, if mineral oil were used in the place of benzene, the preferred surfactant would be oleyl poly ethoxy (2) ethanol ether. Each combination of cationic monomer and suspending medium will perform best with a specific surface active agent or combination of surface active agents as may be determined by persons skilled in the art. The proportions of these components should be balanced to obtain a stable emulsion polymerization.

Thus, our invention contemplates a method of forming cationic, water-soluble polymers comprising (a) forming an aqueous solution of cationic monomer and polyunsaturated copolymerizable monomer, (b) emulsifying the solution thereof in a water-insoluble liquid, and (c) polymerizing the monomers by free radical generation.

The cationic monomer may be present in the aqueous phase in amounts from about 5 to 95 percent by weight of the aqueous phase, and the crosslinking agent about 0.005 to 5.0 mole percent based on the cationic monomer. The surfactant or emulsifier may be 0.5 percent to 10 percent by weight of the total mixture. The water-insoluble liquid forming the continuous phase of the inverse emulsion should be about 25 percent to about 90 percent by weight of the total emulsion. The free radical polymerization initiator should be present in amounts from $10^{-7}$ to $10^{-1}$ mole per mole of cationic monomer.

We claim:

1. A method of releasing water from activated sewage sludge which comprises steps of adding to the sludge from about 0.1 ppm to about 20 ppm of a cationic polymer prepared by forming an aqueous solution of from about 5% to about 95% by weight dimethyl diallyl ammonium chloride and about 0.005 to about 5 mole %, based on the moles of dimethyl diallyl ammonium chloride of a copolymerizable, polyunsaturated cross-linking monomer selected from the group consisting of methylenebisacrylamide, methyl triallyl ammonium chloride and tetraallyl ammonium chloride, preparing a water-in-oil emulsion of said aqueous solution in a water insoluble liquid containing a surfactant, said water insoluble liquid being about 25% to about 90% by weight of the total emulsion and said surfactant being 0.5 percent to 10 percent by weight of the total emulsion, and heating the emulsion to a temperature sufficient to essentially completely polymerize the monomers in the presence of a free radical polymerization initiator, said free radical polymerization initiator being present in amounts from $10^{-7}$ to $10^{-1}$ mole per mole of dimethyl diallyl ammonium chloride, and filtering the sludge-polymer mixture.

* * * * *